T. HERBERT.
Potato Planter.
No. 108,591. Patented Oct. 25, 1870.
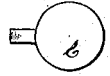
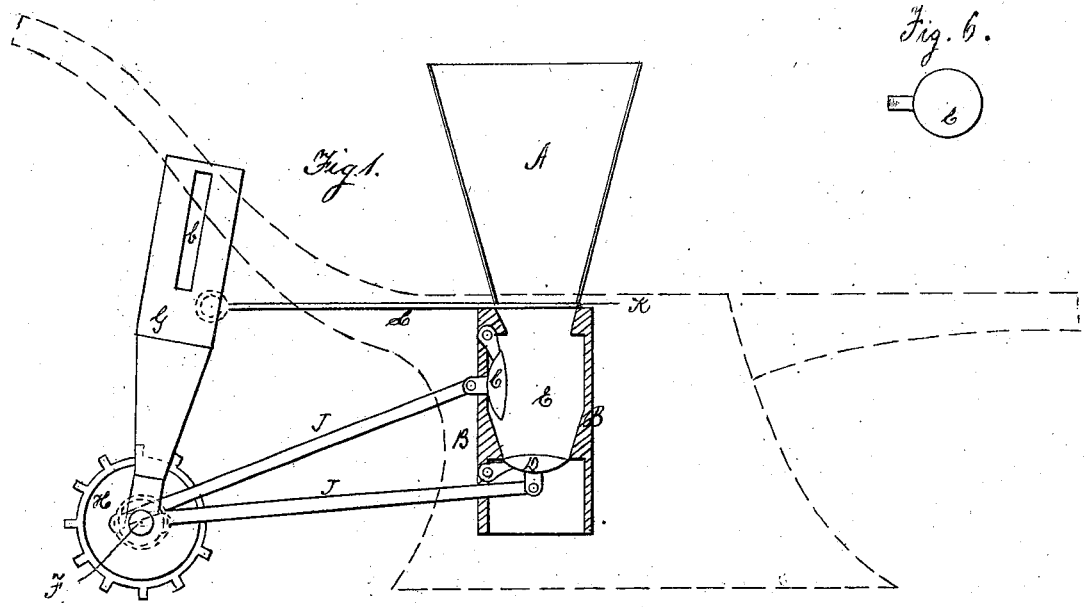
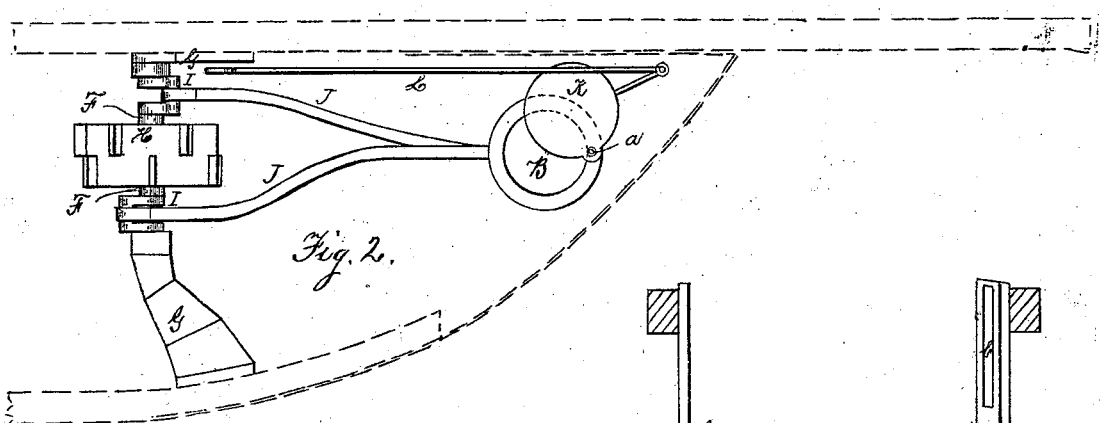
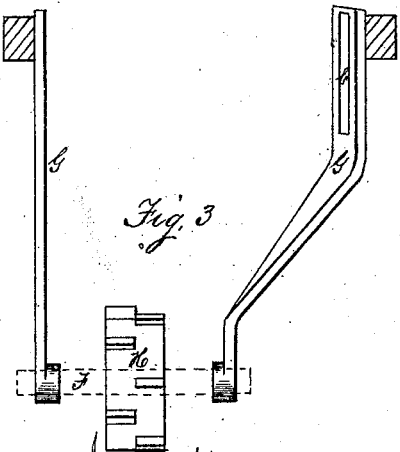
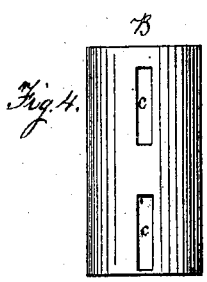
Witnesses
H. R. Kneass
C. McAllister
Inventor
Theodore Herbert
By Francis D. Pastorius
his Attorney in fact

United States Patent Office.

THEODORE HERBERT, OF PHILADELPHIA, PENNSYLVANIA.

Letters Patent No. 108,591, dated October 25, 1870.

IMPROVEMENT IN POTATO-PLANTERS.

The Schedule referred to in these Letters Patent and making part of the same

*To all whom it may concern:*

Be it known that I, THEODORE HERBERT, of the city and county of Philadelphia, and State of Pennsylvania, have invented an Improved Potato-Planter, to be applied to plows; and I do hereby declare that the following is a full, clear, and exact description of the same, reference being had to the accompanying drawing, and to the letters of reference marked thereon making part of this specification, in which—

Figure 1 is a side view, partly sectioned, the plow being shown in dotted lines;

Figure 2 is a plan view;

Figure 3 is an end view, showing the method employed for suspending the crank-shaft;

Figure 4 is an elevation of the valve-cylinder.

Figure 5 is a top view of the valve-cylinder, showing one of the valves open; and Figure 6 is a plan view of the valves.

Similar letters refer to similar parts in the several views.

A is a funnel-shaped hopper, which is attached to the beam of a plow. Its lower end opens into the valve-cylinder B, which is contained by the mold-board of the plow.

C and D are valves, placed one at the upper end of the cylinder, and the other sufficiently low to leave a space or chamber, E, between them.

F is a double crank-shaft, which is suspended from the handles of the plow by the adjustable pendants G, sufficiently low to permit the toothed driving-wheel H to run in the furrow.

The cranks I are in the same plane, but in opposite directions, so that their action on the valves C D, by means of the valve-rods J, shall cause them to open and close in turn.

K is a cut-off valve on the top of the cylinder B. It is rotated around the pin *a*, as a center, by means of the handle or rod L.

The valves C D open downward; their bottom surfaces conform exactly with the internal surface of the cylinder B, as shown at fig. 5, so that, when open, they snugly fit the cylinder, and thereby not unnecessarily occupy its area. Their upper surfaces are slightly rounded, to preserve the seed or potato-cuttings from being bruised or crushed while the valves are closing.

The pendants G, for carrying the cranked axle F, are made adjustable by means of the slots *b*, through which the holding-bolts pass for fastening them to the handles of the plow. When the plow is not used for planting the bolts are loosened, and the axle F and the driving-wheel H are raised clear of the furrow.

The valve-rods J pass into the cylinder B through the opening *c*, shown at fig. 4.

The operation of the aforesaid potato-planter is as follows:

The upper valve or cut-off K is first closed, which cuts off all communication of the hopper A with the valve-cylinder B. The hopper is then filled with the seed or potato-cuttings.

When the plow is started in the furrow, the valve K is opened by means of the hand-rod L. The driving-wheel H is turned by its contact with the furrow. The cranked axle F, on turning, causes the valves C D to alternately open and shut, whereby only a single potato-cutting or seed is admitted to and dropped from the cylinder into the furrow at a time.

On crossing or turning the headlands the valve K is closed, to prevent dropping and wasting the seed.

What I claim as my invention, and desire to secure by Letters Patent, is—

1. The cylinder B, valves C D, crank-shaft F, and the connecting or valve-rods J, when combined and arranged as shown.

2. The hopper A, cylinder B, and the valves C D, when constructed, arranged, and operated substantially as shown and described.

3. The hopper A, cylinder B, and the shut-off valve K, when combined and arranged substantially as shown and described.

In testimony whereof I hereunto sign my name to this specification in presence of two subscribing witnesses.

THEODORE HERBERT.

Witnesses:
FRANCIS D. PASTORIUS,
JOHN YILLE.